United States Patent [19]

Michelson

[11] Patent Number: 4,594,539
[45] Date of Patent: Jun. 10, 1986

[54] LIGHT VALVE

[76] Inventor: Gunnar P. Michelson, 505 Sea Ranch Dr., Santa Barbara, Calif. 93109

[21] Appl. No.: 529,945

[22] Filed: Sep. 6, 1983

[51] Int. Cl.$^4$ .............................................. G05B 1/06
[52] U.S. Cl. .................................. 318/640; 318/625; 318/480; 350/271; 250/229; 310/231
[58] Field of Search ................... 250/231 SE, 229; 318/313, 640, 480, 625; 310/46, 231, 234, 235; 350/271–275

[56] References Cited

U.S. PATENT DOCUMENTS

| 1,874,094 | 8/1932 | Ford et al. ........................... 318/625 |
| 2,166,947 | 7/1939 | Fayerweather ................. 350/272 X |
| 3,098,187 | 7/1963 | Sciaky ................................. 318/640 |
| 3,270,220 | 8/1966 | Isaacson ............................ 310/46 X |
| 3,419,740 | 12/1968 | Dotto .................................... 310/46 |
| 3,427,519 | 2/1969 | Louis .............................. 318/625 X |
| 3,435,213 | 3/1969 | Colbow et al. ................. 350/272 X |
| 3,454,328 | 7/1969 | Engel .................................... 350/272 |
| 3,526,448 | 9/1970 | Senseney ............................. 350/272 |
| 3,614,576 | 10/1971 | Raphael ............................... 318/625 |
| 3,997,828 | 12/1976 | Bottcher et al. ..................... 318/625 |
| 4,021,711 | 5/1977 | Erickson et al. ..................... 318/640 |
| 4,123,757 | 10/1978 | Lapp et al. ...................... 318/627 X |
| 4,158,491 | 6/1979 | Demick ............................ 350/271 X |
| 4,191,916 | 3/1980 | Zasio et al. .......................... 318/640 |
| 4,405,884 | 9/1983 | Weber .............................. 318/625 X |
| 4,425,537 | 1/1984 | Phillips et al. .................. 318/480 X |

Primary Examiner—B. Dobeck
Attorney, Agent, or Firm—Christie, Parker & Hale

[57] ABSTRACT

A light valve has a pair of rotating vanes for controlling the cross section of a light beam passing between the vanes. The vanes rotate on corresponding shafts, each controlled by its own integral motor. Separate feedback control systems produce electrical control signals to each motor for rotating each shaft independently of the other to control the desired phase angles of the vanes. In one embodiment, both motors are permanent magnet direct current servo motors in which the wound armature is an integral part of each shaft. A stationary magnetic field generated by permanent magnets is common to both motors. Power is supplied to each armature by a pair of thin, parallel, flexible, electrically conductive strips extending from an end of each shaft. The conductive strips reduce the torque on the shaft when twisted during operation. In one embodiment, the control system produces a calibrated digital control signal from a PROM representing the desired phase angles of the rotating blades. The digital signal is converted to analog control signals compared with position feedback signals from the rotating blades and damping signals produced by blade velocity feedback signals. Error signals fed to variable gain amplifiers control the positions of the vanes. Whenever new commands are input to the variable gain amplifiers, amplifier gain is temporarily switched to a high gain mode, and after the phase angle of the shaft has stabilized, the amplifier gain is switched back to a low gain mode. The separate motors and their servo systems speed up response time and substantially reduce any tendency toward oscillations.

30 Claims, 8 Drawing Figures

Fig.2.

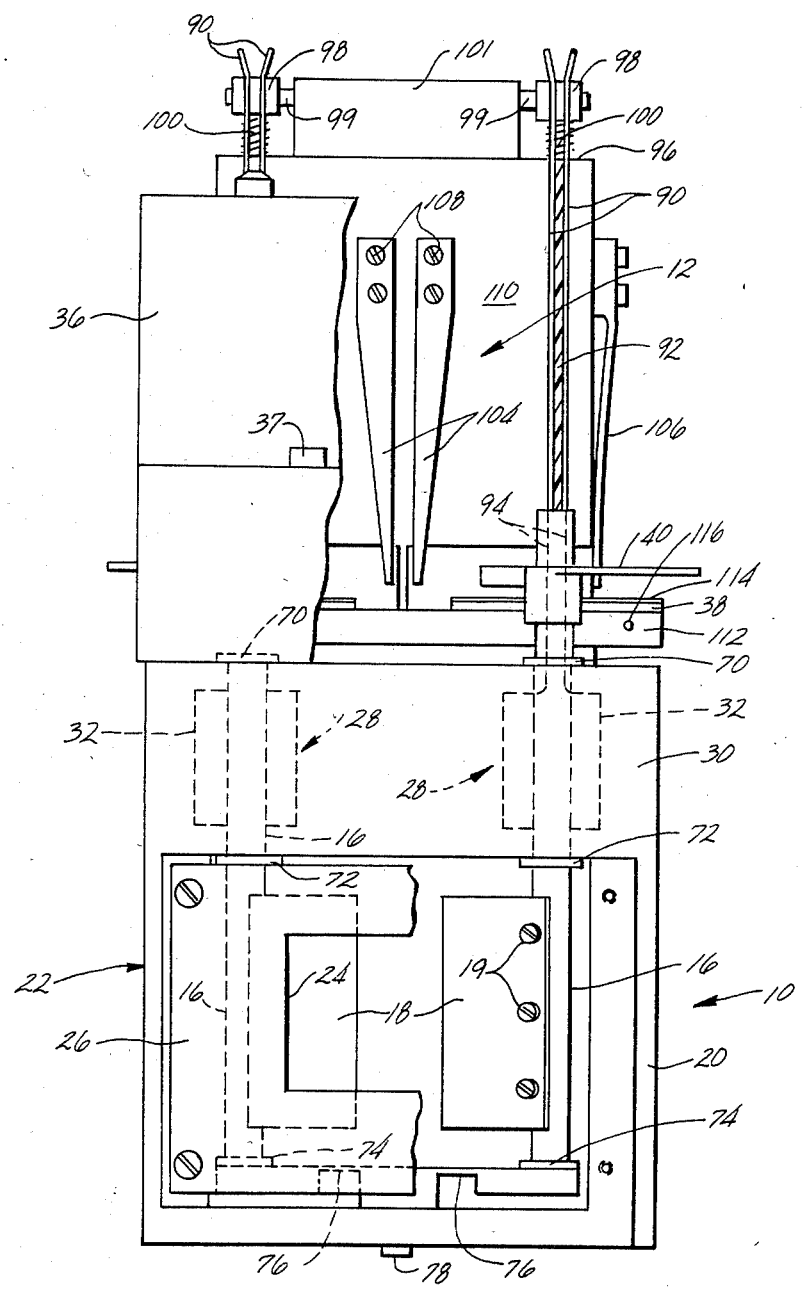

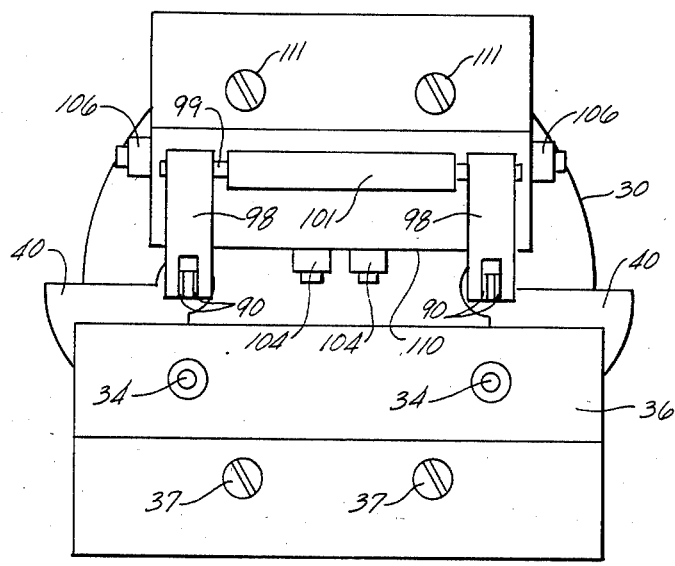
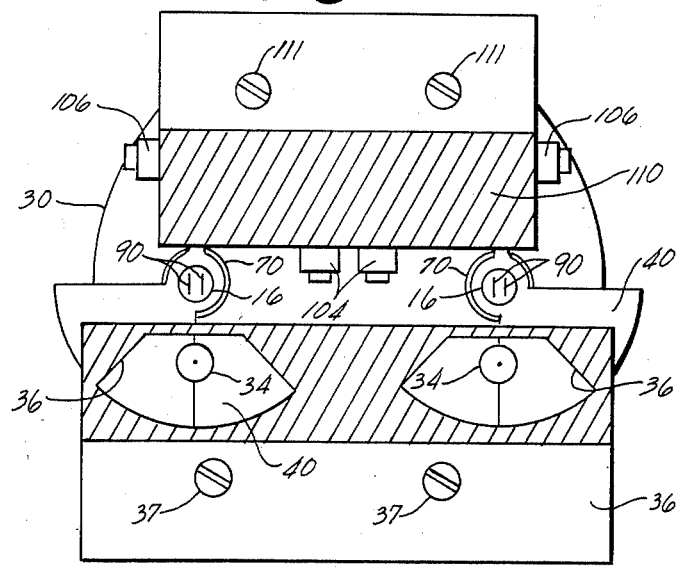

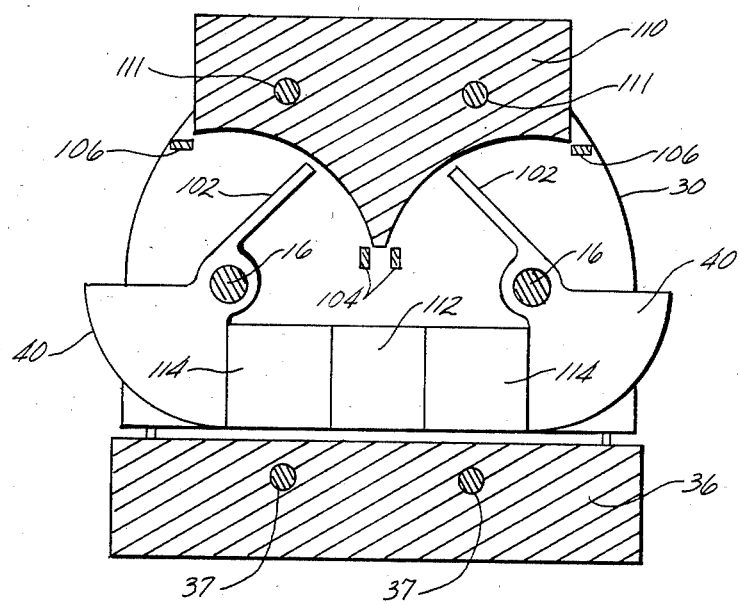

LIGHT VALVE

BACKGROUND OF THE INVENTION

1. Field of the Invention

This invention relates to light valves, and more particularly to a light valve with rotatable vanes controlled by separate integral servo motors that provide a fast response time for the light valve. One use of the light valve is in high speed film printing in which printing speed is increased over systems using slower conventional light valves.

2. Description of the Prior Art

A light valve is a device that varies the size of an aperture through which a light beam passes. A common use of light valves today is in film printing. The light valve is adjusted to control the cross-sectional size of the light beam passing through it for adjusting the exposure in accordance with the light levels of scene changes in the film being printed. Typically, separate light valves are used for each of three principal colors in the film printing process, and the exposures from each light valve are independently controlled.

A common form of light valve includes a pair of vanes carried on a pair of rotating shafts. The vanes protrude into the path of the light beam, and the shafts are rotated to move the vanes toward or away from each other to form a variable width optical slit for controlling the amount of light passing through the vanes. Usually, the shafts are counter-rotated relative to each other and through approximately the same phase angle so the center of the aperture formed by the vanes does not appreciably shift laterally during operation of the light valve.

Light valves of various forms have been developed in the past for controlling the phase angle of the shafts that rotate the vanes. These have included use of a stepper motor, or means for rotating the shafts against stops which have been preset prior to each new aperture change. When the shafts are rotated by a common motor, mechanical coupling means such as linkages, gears, or the like are used to rotate both shafts simultaneously through the same angle. Such mechanical coupling increases the inertia of the moving parts which, in turn, slows down the response time of the light valve. Also, it is difficult to avoid backlash and added elasticity which can cause oscillations in the mechanical system that controls the vanes. Moreover, these problems are amplified when attempting to speed up the response time of the light valve. For instance, in the past, the fastest light valves with mechanical coupling have had a response time on the order of about 5 milliseconds. In a film printing system, "response time" is the time required for the vanes to assume a new position to produce a new sized aperture for each scene change in the film. Present light valves with their connecting linkages and gearing have had endless oscillation problems when operated at higher speeds. Film printing speed with such divices has been limited to about 600 feet per minute.

There is a need to provide a film printing system that can operate at higher speeds. The slow response time of the light valves with mechanical coupling as used in previous film printing systems has been a principal obstruction to higher speed printing.

SUMMARY OF THE INVENTION

This invention provides a light valve having a vane control system which can effectively operate at much higher speeds than known light valves. Briefly, the light valve includes a pair of rotating vanes for controlling the cross-sectional size of a light beam passing between the vanes. The vanes rotate on corresponding shafts, each controlled by its own integral servo motor. Separate feedback control systems produce electrical control signals to operate each motor for rotating each shaft independently of the other to control the desired phase angle of the light-admitting vanes.

In one embodiment, the shafts are supported on preloaded backlash-free bearings, and both motors are permanent magnet direct current servo motors in which the wound armature is an integral part of each shaft. In another embodiment, each servo has a variable gain amplifier controlled so as to switch from a low gain mode to a high gain mode with each new command signal. The controls switch back to the low gain mode after the light valve aperture stabilizes.

The light valve has a fast response time and greatly reduced tendency to oscillate at higher speeds because of absence of backlash; because of absence of elastic coupling between the two shafts and between the two shafts and the motor; and because of short, stiff elastic paths between the various masses located on each shaft.

Because of the lack of mechanical linkages or gearing between the two shafts, and because of using a separate motor for each shaft, response time of the light valve is greatly reduced. Use of the separate variable gain amplifier in each servo system also produces faster response time and reduced tendency toward oscillations.

These and other aspects of the invention will be more fully understood by referring to the following detailed description and the accompanying drawings.

DRAWINGS

FIG. 2 is a semi-schematic side elevation view, partly broken away and partly in cross section, illustrating mechanical components of the light valve.

FIG. 3 is a semi-schematic side elevation view, partly broken away, taken on line 3—3 of FIG. 2.

FIG. 4 is a top view of the light valve, taken on line 4—4 of FIG. 2.

FIG. 5 is a cross section through the light valve, taken on line 5—5 of FIG. 2.

FIG. 6 is a cross section through the light valve, taken on line 6—6 of FIG. 2.

DETAILED DESCRIPTION

Figure 1:
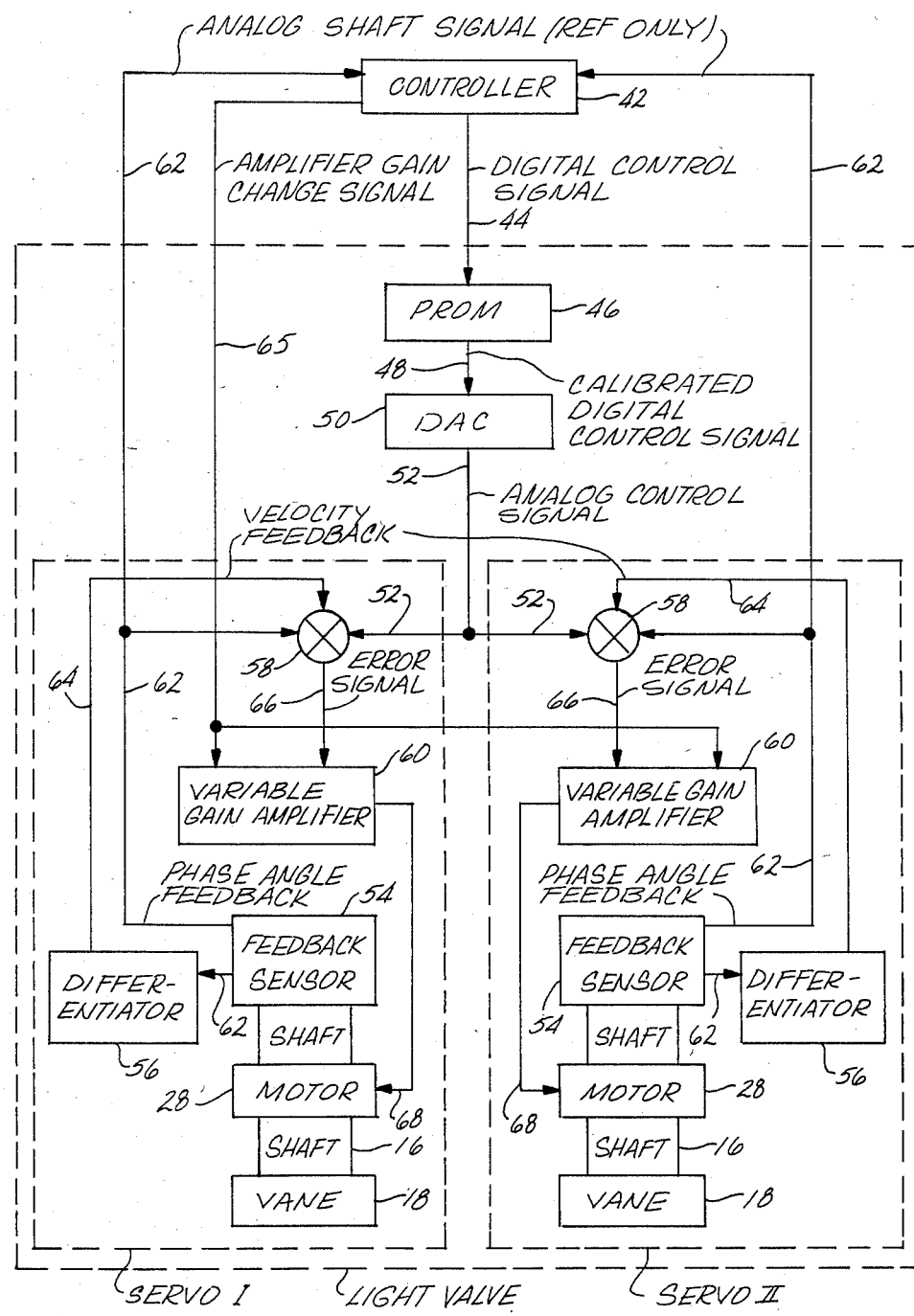
FIG. 1 is a block diagram illustrating a system for controlling the rotating shafts and vanes of a light valve according to principles of this invention.
Figure 8:
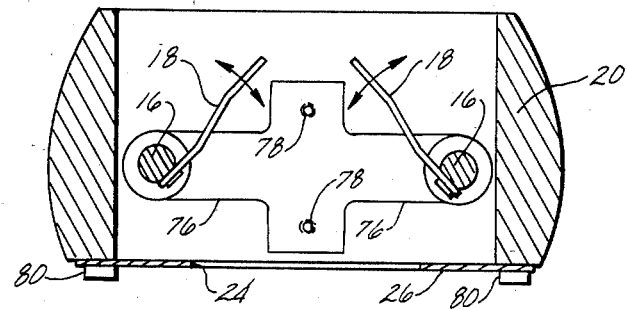
FIG. 8 is a cross section through the light valve, taken on line 8—8 of FIG. 2.
Figure 7:
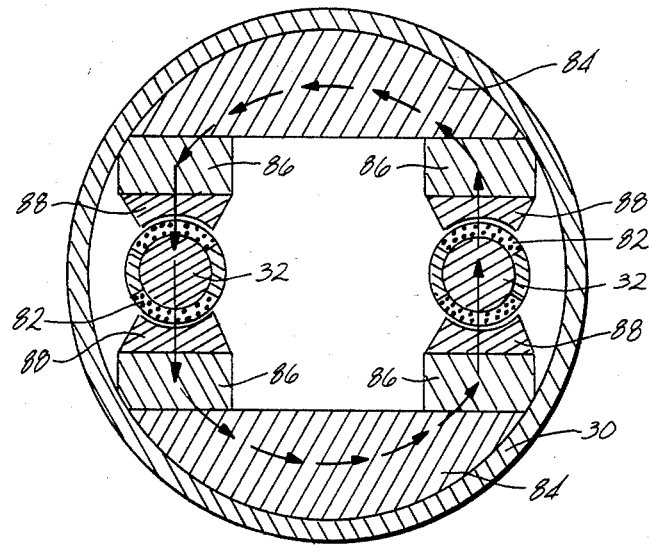
FIG. 7 is a cross section through the light valve, taken on line 7—7 of FIG. 2.

FIG. 1 is a block diagram illustrating electrical controls for the light valve of this invention. The control system of FIG. 1 will be understood best by first referring briefly to FIGS. 2 and 3, which illustrate mechanical components of the light valve controlled by the control system of FIG. 1. The light valve includes three principal assemblies, a vane assembly 10, a stop assembly 12, and an optical assembly 14. The vane assembly includes a pair of elongated shafts 16 mounted parallel to one another and rotatable independently about their longitudinal axes. Each shaft carries a thin, flat rectangular opaque vane 18. The vanes are rigidly affixed to the shafts by screws 19. The vanes are mounted adjacent to each other in a symmetrical arrangement so they project away from the shafts toward each other. The vanes are mounted inside an aperture section 20 of a vane housing 22. The vanes block part of the light passing through a rectangular aperture 24 in a plate 26 affixed to the aperture section of the housing. Light is directed through an opening in the side of the aperture section opposite the aperture plate. The light is directed toward the vanes. A controlled amount of light passing through the space between the vanes passes through the aperture 24 in the aperture plate 26. The shafts are controlled to rotate in unison for rotating the vanes toward or away from each other. This adjusts the amount of light passing through the aperture 24 to produce a controlled light exposure.

Figure 2:
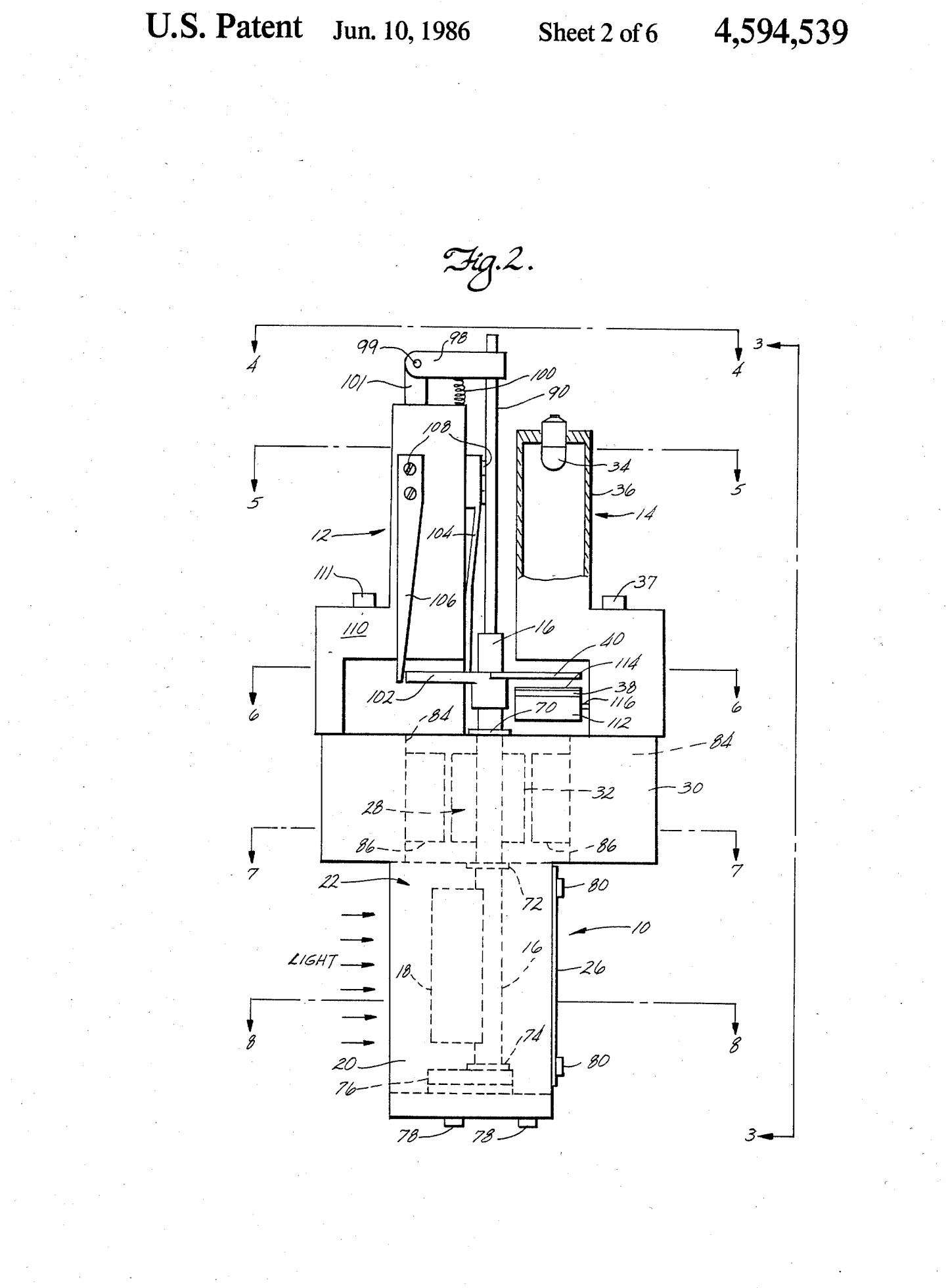

Each shaft is rotatable by a separte servo motor 28 illustrated schematically in FIGS. 2 and 3. The servo motors are preferably permanent magnet direct current motors located in a servo motor section 30 of the housing 22. Each servo motor is mounted directly to the shaft in close proximity to the vane portion of the shaft. Other elements of the servo motors are described below.

The instantaneous phase angles of the vanes 18 are sensed by optical phase angle sensors, one for each shaft. Each phase angle sensor includes a light bulb 34 in the upper end of a bulb housing 36. The bulb housing is affixed to the vane housing by screws 37. The light bulb illuminates a photocell 38, and an opaque shutter blade 40 carried on each shaft partially blocks the light flux passing to each photocell. The output voltage generated by each photocell is essentially proportional to the phase angle of each vane. These output voltage signals are used as vane phase angle feedback signals in the vane control system.

Referring again to FIG. 1, the control system includes a controller 42 which produces a digital control signal 44 representing the desired size of the aperture between the vanes at each instant throughout operation of the light valve. The controller can receive input signals from an external computer to represent desired time-dependent light changes. In a film printing system, the controller can receive input data from a paper tape running with the film for indicating changing light levels from scene changes in the film. The digital control signal 44 from the controller is fed to a programmable read-only memory or PROM 46 which produces a calibrated digital control signal 48. The PROM is programmed to convert the digital signals from the controller into calibrated digital control signals that can be fed to a digital-to-analog converter or DAC 50 to produce an analog control signal 52. The analog voltage is a function of the instantaneous desired aperture opening through the vanes. This signal provides a reference position signal for each of two approximately identical second order servos, one for each shaft. Each of these two servos controls the phase angle of a separate shaft.

Because of variations in the properties of the feedback components from light valve to light valve, a somewhat different analog voltage signal 52 may be required to obtain for each light valve the same aperture size for the same digital input signal. In order to make different light valves interchangeable, the PROM in each light valve is programmed such that for the same digital input signal, the same aperture size is obtained for each light valve.

Each servo system includes the servo motor 28 for rotating the shaft 16 and vane 18; an optical phase angle sensor or feedback sensor 54 which includes the light bulb 34, the photocell 38 and the shutter blade 40; a differentiator 56; a summer 58; a variable gain amplifier 60; and a power supply (not shown in FIG. 1). The analog control signal 52 is fed to the summer 58 of each servo. The voltage output from the photocell 38 in each optical phase angle sensor 54 provides a vane phase angle feedback signal 62. The light falling on the photocell generates in it a voltage which is approximately proportional to the area of the photocell exposed to the light. A change in the phase angle of the shaft will change the amount of light blocked by the shutter blade 40. Therefore, the voltage generated by the photocell is an accurate measure of the actual phase angle of the shaft at each instant throughout operation of the light valve. This voltage is a function of the actual size of the aperture in the light valve (the aperture being the space between the vanes). The voltage output from the photocell is fed to the summer 58 as the vane position feedback signal 62. The same vane angle feedback signal 62 is fed to the differentiator 56 which is also in the feedback loop. The differentiator is an electronic differentiator which differentiates the phase angle feedback signal 62 and produces a voltage output 64 in the form of a velocity feedback signal proportional to the instantaneous angular velocity of the shaft. It is approximately independent of the phase angle of the shaft. The velocity feedback provides damping for the servo in a manner well known to the art of second order closed loop servo systems.

The output voltage 52 from the DAC 50, which represents the desired aperture size of the light valve, and the voltage output 62 from the photocell, which represents the actual aperture size of the light valve, and the time-differentiated voltage 64 from the photocell, which represents the angular velocity of the shaft, are all fed into the summer 58. The sum of these three voltages represents an error voltage 66 which is amplified by the variable gain amplifier 60. Whenever new command signals are introduced into the light valve via the digital control signal 44, the variable gain amplifier is temporarily switched from a low gain mode to a high gain mode. Each variable gain amplifier receives an amplifier gain change signal 65 from the controller to indicate when the amplifier should be switched from one mode to the other. The high gain causes the shaft to assume its new phase angle in a very short time, but it also causes the residual phase angle error, due to bearing friction, to be small. After a short time delay, when the phase angle of the shaft has stabilized, the gain of the amplifiers switches back to its initial low gain mode. Switching back to the low gain mode does not change the residual phase angle error, but it reduces substantially any tendency to oscillations and also substantially reduces the residual error current. Reducing the residual error current becomes significant because it can prevent overheating of the motor armature if bearing friction should happen to become large at any time during operation of the light valve. The variable gain amplifier produces an amplified voltage output 68 which is fed to the servo motor 28. The magnitude of the voltage output 68 represents the instantaneous amount by which the motor must rotate the shaft to correct for the error signal so the error goes to zero.

The phase angle feedback signal 62 is also fed back to the controller 42 as an analog reference signal representing the instantaneous rotational position of the shaft. This provides safety monitoring for the light valve. For example, in a film printing system, if the actual size of the aperture is too large when compared with the desired aperture size, indicating that some problem may have developed in the controls, a command can be produced by the controller to stop the film from advancing.

The mechanical components of the light valve will now be understood best by referring to FIGS. 2 through 8. For clarity, the electronics have not been shown in these figures.

Each of the two shafts 16 is supported in the motor section 30 of the vane housing 22 by two backlash-free bearings 70 and 72. These bearings are mounted in close proximity to and on opposite sides of the motor 28. The bottom of each shaft is supported by a spherical bearing 74 which is preloaded by a corresponding leaf spring 76. Each leaf spring is attached to a base of the housing by screws 78. One of the other bearings 70 or 72 for each shaft also can be spring loaded. The aperture plate 26 is affixed to the vane section 20 of the housing by screws 80. As shown best in FIG. 8, the vanes project outwardly from their corresponding shafts at approximately the same angle. The shafts are rotated about their longitudinal axes to rotate the vanes in the direction of the arrows shown in FIG. 8 for moving the vanes toward or away from each other to control the amount of light passing between them. The vanes block part of the light that passes through the aperture in the aperture plate of the light valve, and the magnitude of the blockage is a function of the phase angle of the shafts.

Each shaft is rotated by its own servo motor 28 which is integral with the shaft. In the illustrated embodiment, a motor armature 32 is integral with each shaft. Each armature 32 with its winding 82 (see FIG. 7) is situated in a strong magnetic field generated by permanent magnets 84 and fortified by pole shoes 86 and yokes 88. The stationary magnetic field, common for both motors, is generated by the permanent magnets plus the associated yokes and pole shoes. The magentic field is indicated by the arrows in FIG. 7.

Electrical current required to rotate each shaft 16 is supplied to each armature winding by a separate pair of conductive strips 90. The conductive strips are elongated, thin, parallel, copper strips each extending upwardly from the upper end of each shaft. In one embodiment, the thin, conductive strips are 0.002 inch thick and 0.080 inch wide. Teflon tape (illustrated schematically at 92 in FIG. 3) between the conductive strips electrically insulates the two strips. The Teflon tape can extend the length of the strips as shown, but preferably is in small sections spaced apart along the length of the strips. The lower ends of the conductive strips are affixed as close a possible to the center of the shaft 16. In one embodiment, the upper end portion of the shaft is hollowed out, and the pair of conductive terminals 94 (see FIG. 3) from the armature winding extend through the hollowed-out portion of the shaft and connect to the lower ends of the conductive strips. A nylon bushing (not shown) surrounds the lower portions of the conductive strips to add stiffness. The interior of the nylon bushing is filled with epoxy or other nonconductive material.

The upper ends of each pair of conductive strips are held to a base 96 of the stop assembly 12 by a corresponding pivoted lever 98. The levers pivot about a shaft 99 supported in a block 101 at the top of the base 96. A coil spring 100 pretensions the conductive strips, i.e., it applies a spring force in the same direction as the long axes of the strips. Thus, the upper ends of each pair of strips are stationary, while the lower ends of each pair rotate with the shaft. The conductive strips are affixed as close as possible to the center of rotation of the shafts in order to not be damaged by the large operational accelerations of the shafts.

The base of the stop assembly is mounted to the motor section 30 of the housing by screws 111. The stop assembly 12 includes a separate elongated arm 102 that rotates on each shaft on a side of the shaft opposite tne shutter blade 40. The maximum angular travel of each shaft is limited by a pair of springloaded stops 104 and 106 positioned so they are contacted by the arm 102 at opposite ends of the shaft's angular travel. Each stop is a pre-loaded leaf spring mounted by screws 108 to a base 110 of the stop assembly. The stops accept the kinetic energy of the rotating masses in the event there is a malfunction of the servo system. The preload reduces the stopping travel of each shaft.

The power for each servo amplifier is provided by a large capacitor (not shown) located inside the light valve. The capacitor is charged by an external power source (not shown) which provides a maximum current that is much smaller than the maximum operating current of the motor. This is permissible because the charging time of the capacitor is much longer than the operating time of the motor. This provides the advantage of having small power wires to the light valve. Also, the low charging current creates only small electromagnetic interference. If a servo should malfunction and try to rotate a shaft against one of the stops, or if a servo tries to rotate a shaft against the drag of a damaged bearing, for example, the strong holding current discharges the capacitor in a rather short time period, after which only the small charging current provided by the external power source will run through the motor, preventing the motor from burning out.

As described above, the optical phase angle sensor, one for each shaft, includes the light bulb 34 which illuminates the photocell 38, while the opaque blade 40 carried on the shaft partially blocks the light passing to the photocell. The light passing from the bulb to the photocell can pass through a mask which can best be described as being similar in shape to a quadrant of an annulus, concentric with the axis of rotation of the shaft. Alternatively, the cross section of the bulb housing 36 can be shaped approximately like a sector of an annulus, as shown in FIG. 5. The photocells are bonded to a substrate 112 and protected by a separate cover glass 114. The substrate is mounted to the bulb housing such that it has a small heat loss only through connecting means which can be pins 116 made of a low thermal conductivity material. The output voltage of the photocells is a function of photocell temperature. To prevent errors due to temperature changes of the photocell, each photocell is bonded to the substrate which is kept at a higher than ambient temperature by means of a heating resistor (not shown) and a control thermistor (not shown) both mounted to the substrate. A second thermistor in the substrate permits monitoring of photocell temperature from the outside, if desired. In order to protect the photocell, the cover glass is bonded to its exposed, sensitive surface.

As described above, the light falling on the photocell generates a voltage which is approximately proportional to the area of the photocell exposed to the light. A change in the phase angle of the shaft will change the amount of light blockage caused by the shutter blade. Therefore, the voltage generated by the photocell is an accurate measure of the phase angle of the shaft, and therefore, the size of the aperture of the light valve. Because of the shape of the mask, as described, the generated voltage is approximately proportional to the phase angle.

Thus, a separate integral motor and closed loop servo system is provided for each shaft. The advantages are fast response time and a low tendency to oscillate even at high speeds.

The motor armature, vane, feedback blade, and stop are an integral part of each shaft. Thus, no linkages are required between the masses, and the elastic paths are short, which enhances fast response and low tendency to oscillate.

The common stationary magnetic field serves both motors, which saves space.

Preloaded energy-absorbing stops are used to prevent damage to bearings and vanes in case of a malfunction of either servo. The preload reduces the stopping travel for a given amount of energy and given allowable maximum torque. The energy-absorbing stops are leaf springs preloaded in bending against their carrying structure. Thus, they require only a small amount of space in the area of greatest importance, viz., where the feedback blade and the photocell are located. The feedback blade and stop are a single monolithic part having the advantage of fewer parts mounted to the shaft.

The control system uses a digital input signal to control the aperture size of the light valve. The digital signal is reasonably immune to ambient noise and is insensitive to changes in the resistance of the input leads and contacts. The DAC can be a 12-bit unit which permits the light valve to be controlled in 4096 different steps. This permits versatile DAC control of the light valve by the programmer so as to match any other light valve.

The capacitor used as the power supply for the servo has small charging current, which permits use of inexpensive external power source, light power leads, and carries only small electromagnetic interference. Further, the limited energy storage capacity of the capacitor prevents the motor from being burned out in case of any malfunction of the servo or a shaft bearing.

The PROM in the light valve is programmed for each light valve individually such that any given digital input signal can generate the same aperture size in all light valves. This provides interchangeability of light valves.

Since each shaft has an analog optical feedback, the photocell output does not vary with time except possibly for a small long-term drift. Furthermore, the output is continuous and has very little noise, which permits it to be differentiated electrically to obtain the angular shaft velocity. The electronic differentiator used to obtain angular shaft velocity is simple with no additional moving parts. The photocell for the optical feedback is mounted to a substrate maintained at a constant temperature by the heating resistor and thermistor. Thus, changes in ambient temperature do not influence the output of the photocell. The substrate of the photocell contains the additional thermistor which may be used to monitor the temperature of the photocell from outside the light valve. The sensitive surface of the photocell is protected by the cover glass which is bonded to it. This provides protection against ambient humidity which could otherwise influence the output of the photocell.

The interior shape of the light housing or the mask shape the beam of light falling on the photocell. Since the aperture of the mask has approximately the shape of a sector of an annulus concentric with the axis of rotation of the shaft, the output of the photocell is approximately proportional to the phase angle of the shaft. This provides an approximately constant gain for the servo amplifier independent of the phase angle. Since an additional lead is provided from the photocell to the outside of the light valve for monitoring, failure of the light valve can be easily detected.

The amplifier has a variable gain, viz., a high gain mode for positioning the shaft and a low gain mode for holding it. The high gain mode is switched on every time a new position signal arrives at the light valve. It causes the shaft to assume its new position in a very short time. The low gain, which is switched back on after the shaft position has stabilized, results in a low holding current, low heating and low oscillating tendency.

The light valve of this invention can be used in high speed film printing in which the light exposure for each principal color is controlled by a separate light valve. High speed film printing has been hampered in the past by light valves having a response time that is too slow, which either slows down film print speed, or if the film is run at higher speeds, then the wrong colors can be printed if the openings in the light valve are not accurate and able to change fast enough. In the present invention, an external signal from a computer or a paper tape moving with the film indicates every light change. Input signals from these external sources are fed to the light valve control systems for independently operating the separate servo motors. Response time is on the order of one millisecond for each change of aperture, which produces much faster film printing than in the past. With this invention, film printing speed can be as high as 3000 feet per minute which is about five times faster than with any known light valve.

What is claimed is:

1. A light valve for varying the size of an opening through which a light beam passes comprising:
a pair of spaced apart rotatable shafts,
a corresponding vane mounted on each shaft so the vanes extend side by side into the space between the shafts,
means for directing light toward the vanes so that rotation of the shafts causes the vanes to move through an angle toward or away from each other for varying the size of the light beam passing between the vanes,
a separate servo meter coupled to each shaft for rotating the shafts in unison to adjust the amount of light passing between the vanes, and for each servo motor closed loop servo means responsive to a vane position input signal representing a desired position of each vane for varying the size of the light beam passing between the vanes, and including means for generating a separate position feedback signal as a function of the actual position of the vane on each rotatable shaft throughout operation of the light valve, and means responsive to the vane position input signal and to each position feedback signal for producing separate motor control signals for independently controlling operation of each servo motor to rotate each shaft and vane to constantly pass a selected amount of light between the vanes.

2. Apparatus according to claim 1 in which each servo motor includes a separate armature winding mounted on each shaft so that each armature rotates with each shaft and in which the closed loop servo means couples the motor control signals to respective armature windings.

3. Apparatus according to claim 2 in which the motor includes a stationary magnetic field for each armature.

4. Apparatus according to claim 1 including a separate arm projecting from each shaft and rotatable with the shaft, and separate energy absorbing stops at opposite ends of travel of the arm, the stops being positioned for contact with the arm to limit rotational travel of the shaft in each of two directions.

5. Apparatus according to claim 4 including a photocell having an output, and an opaque shutter balde carried on each shaft for rotating with the shaft to pass light to the photocell as a function of the angular position of each shaft, the output of the photocell being substantially proportional to the angular position of each shaft for generating the separate position feedback signals representing the actual positions of the vanes during rotation of each shaft.

6. Apparatus according to claim 1 including a photocell having an output, and an opaque shutter blade carried on each shaft for rotating with the shaft to pass light to the photocell as a function of the angular position of each shaft, the output of the photocell being substantially proportional to the angular position of each shaft for generating the separte position feedback signals representing the actual positions of the vanes during rotation of each shaft.

7. Apparatus according to claim 1 including thin, flat flexible conductive strips each having one end attached for rotation to the end of a corresponding sahft, with the opposite ends of the strips each being stationay, and in which eact motor includes a separate armature winding affiexed to the shaft corresponding to each motor, the conductive strips providing means for conducting electrical current to the armature windings for coupling the motor control signals to the motors.

8. Apparatus according to claim 7 including means for allowing one end of the conductive strips to rotate with the shaft while the other end of the conductive strips remains substantially stationary.

9. Apparatus according to claim 1 in which the closed loop servo means for each servo motor includes means for varying the gain of the motor control signal fed to each motor, means for switching the motor control signal between a high gain mode and a low gain mode, and means for switching from the low gain mode to the high gain mode in response to a change in the vane position input signal representing a desired change in the amount of light to be passed between the vanes.

10. Apparatus according to claim 1 in which an aramture winding of the motor is mounted to the shaft in close proximity to the vane.

11. Apparatus according to claim 1 including bearings mounting the shaft for rotation in close proximity to opposite sides of the motor.

12. A light valve for varying the size of an opening through which a light beam passes:
a pair of spaced apart rotatable shafts,
a vane carried on each shaft so the vanes extend side by side into the space between the shafts,
means for directing light toward the vanes so that rotation of the shafts causes the vanes to move through an angle toward or away from each other for varying the size of the light passing between the vanes,
a separate servo motor on each shaft, each servo motor having a separate armature mounted on each shaft, and
separate closed loop feedback means responisve to a vane position input signal representing a desired position of each vane for varying the size of the light beam passing between the vanes, and including means for generating a separate vane position feedback signal as a function of the actual position of the vane on each rotatable shaft throughout operation of the light valve, and means responsive to the vane position input signal and to its corresponding vane position feedback signal for producing separate motor control signals fed to the separate aramture windings for independently controlling each servo motor to rotate the shafts in proportion to the motor control signals for rotating the vanes through a phase angle that constantly produces a selected amount of light passing between the vanes.

13. Apparatus according to claim 12 in which the closed loop feedback means is a second order servo.

14. Apparatus according to claim 12 including a stationary magnetic field gnerated by permanent magnet means surrounding each armature.

15. Apparatus according to claim 12 including a separate elongated, thin, flexible electrically conductive strip coupled to the armature winding of each servo motor, one end of each conductive strip being rotatable with rotation of each shaft for supplying electrical input signals to the armature, and means for holding apparatus ends of the conductive strips stationary.

16. Apparatus according to claim 12 in which each closed loop servo means includes means for varying the gain of the motor control signal fed to each motor, means for switching the motor control signal between a high gain mode and a low gain mode, and means for switching from the low gain mode to the high gain mode in response to a change in the vane position input signal representing a desired change in the amount of light to be passed between the vanes.

17. Apparatus according to claim 12 including means for mounting each shaft for rotation independently of the other shaft so that each servo motor and its corresponding closed loop servo means independently controls angular rotation of each shaft.

18. Apparatus according to claim 17 in which each closed loop servo means includes means for varying the gain of the motor control signal fed to each motor, means for switching the motor control signal between a high gain mode and a low gain mode, and means for switching form the low gain mode to the high gain mode in response to a change in the vane position input signal representing a desired change in the amount of light to be passed between the vanes.

19. Apparatus according to claim 18 including an elongated, thin, flexible electrically conductive strip coupled to the armature winding of each servo motor, the conductive strips being rotatable with rotation of each shaft for supplying electrical input signals to the armature.

20. Apparatus according to claim 19 in which the closed loop feedback means is a second order servo.

21. Apparatus according to claim 20 including a stationary magnetic field generated by permanent magnet ans surrounding each armature.

22. A light valve for varying the size of an opening through which a light beam passes comprising:
a pair of rotatable shafts,
a corresponding vane on each shaft,
means for directing light toward the vanes so that rotation of the vanes can pass a selected amount of light between the vanes, a separate servo motor coupled to each shaft for rotating the shafts in unison to adjust the amount of light passing between the vanes, and for each servo motor
closed loop servo means for controlling operation of the motor to rotate its corresponding shaft to constantly pass a selected amount of the light between the vanes, in which each closed loop servo means generates (1) a position feedback signal dependent upon the instantaneous phase angle of rotation of the vane, and (2) a velocity feedback signal dependent upon the rate at which the shaft is rotating; and including means for summing the position feedback signal and the velocity feedback signal along with an input command representing the desired amount of light to pass between the vanes to produce an error signal for controlling the motor.

23. Apparatus according to claim 22 in which each closed loop servo means includes means for varying the gain of a control signal fed to the motor, means for switching the control signal between a high gain mode and a low gain mode, and means for switching form the low gain mode to the high gain mode in response to a change in an input command signal representing a desired change in the amount of light to be passed between the vanes.

24. Apparatus according to claim 22 in which each servo motor includes a separate armature winding mounted on each shaft, and in which the closed loop servo means provides electrical control signals to each armature winding.

25. Apparatus according to claim 24 in which the feedback means includes a photocell having an output, and an opaque shutter blade carried on each shaft for rotating with the shaft to pass light to the photocell in proportion to the angular position of the shaft, the output of the photocell being a function of the angular position of the shaft; the shutter balde, armature and the vane all being rigidly affixed to each shaft to reduce vibrations.

26. A light valve for varying the size of an opening through which a light beam passes comrpising:
a pair of spaced apart rotatable shafts,
a corresponding vane mounted on each shaft so the vanes extend side by side into the space between the shafts,
means for directing light toward the vanes so that rotation of the vanes causes the vanes to move through an angle toward or away from each other for varying the size of the light beam passing between the vanes,
a separate servo motor coupled to each shaft for rotating the shafts in unison to adjust the amount of light passing between the vanes, and
closed loop servo means responsive to a common external input command representing a desired amount of light to pass between the vanes, the servo means comprising separate, independent second order closed loop servo systems each responsive to the common input command for producing separate motor control signals for independently controlling operation of each motor to constantly rotate the vanes in unison to apss a selected amount of the light between the vanes.

27. Apparatus according to claim 26 in which each servo motor includes a separate armature winding mounted on each shaft, the closed loop servo means coupled said motor control signals to each armature winding.

28. Apparatus according to claim 27 including a photocell having an output, and an opaque shutter blade carried on each shaft for rotating with the shaft to pass amount of light to the photocell dependent upon the angular position of the shaft, the output of the photocell being substantially proportional to the angular position of the shaft.

29. Apparatus according to claim 28 in which the vane armature and shutter blade are all rigidly affixed to the common shaft for forming a single rigid unit to reduce vibrations.

30. Apparatus according to claim 26 in which each closed loop servo means includes means for varying the gain of the control signal fed to the motor, means for switching the motor control signal between a high gain mode and a low gain mode, and means for switching form the low gain mode to the high gain mode in response to a change in the input command signal representing a desired change in the amount of light to be passed between the vanes.

* * * * *